United States Patent [19]
Judson

[11] Patent Number: 6,019,197
[45] Date of Patent: Feb. 1, 2000

[54] AIR BRAKE STROKE GAGE AND SEAL

[75] Inventor: Daniel G. Judson, Fort Walton Beach, Fla.

[73] Assignee: Fleet Maintenance Technologies, Inc., Ft. Walton Beach, Fla.

[21] Appl. No.: 09/094,517

[22] Filed: Jun. 15, 1998

[51] Int. Cl.[7] ...................................................... F16D 66/02
[52] U.S. Cl. ............................. 188/1.11 W; 188/1.11 R; 116/208
[58] Field of Search ........................... 92/5 R, 63, 130 A; 188/1.11 R, 1.11 W, 79.51, 79.55, 170; 116/208; 33/609, 610, DIG. 2

[56] References Cited

U.S. PATENT DOCUMENTS

| | | | |
|---|---|---|---|
| 4,776,438 | 10/1988 | Schaudelweier | 188/1.11 W |
| 5,002,164 | 3/1991 | Bowyer | 188/1.11 W |
| 5,540,448 | 7/1996 | Heinzen | 116/208 |

*Primary Examiner*—Chris Schwartz
*Attorney, Agent, or Firm*—William B. Noll

[57] ABSTRACT

An improved air brake stroke gage including, an elastomeric-grommet around the push rod to seal the air brake housing during the "inactive" mode of the brake system, and a pivotally mounted reference marker to be shifted to selected positions to provide an easy and quick usual indication of the adjustment of the air brake system.

6 Claims, 1 Drawing Sheet

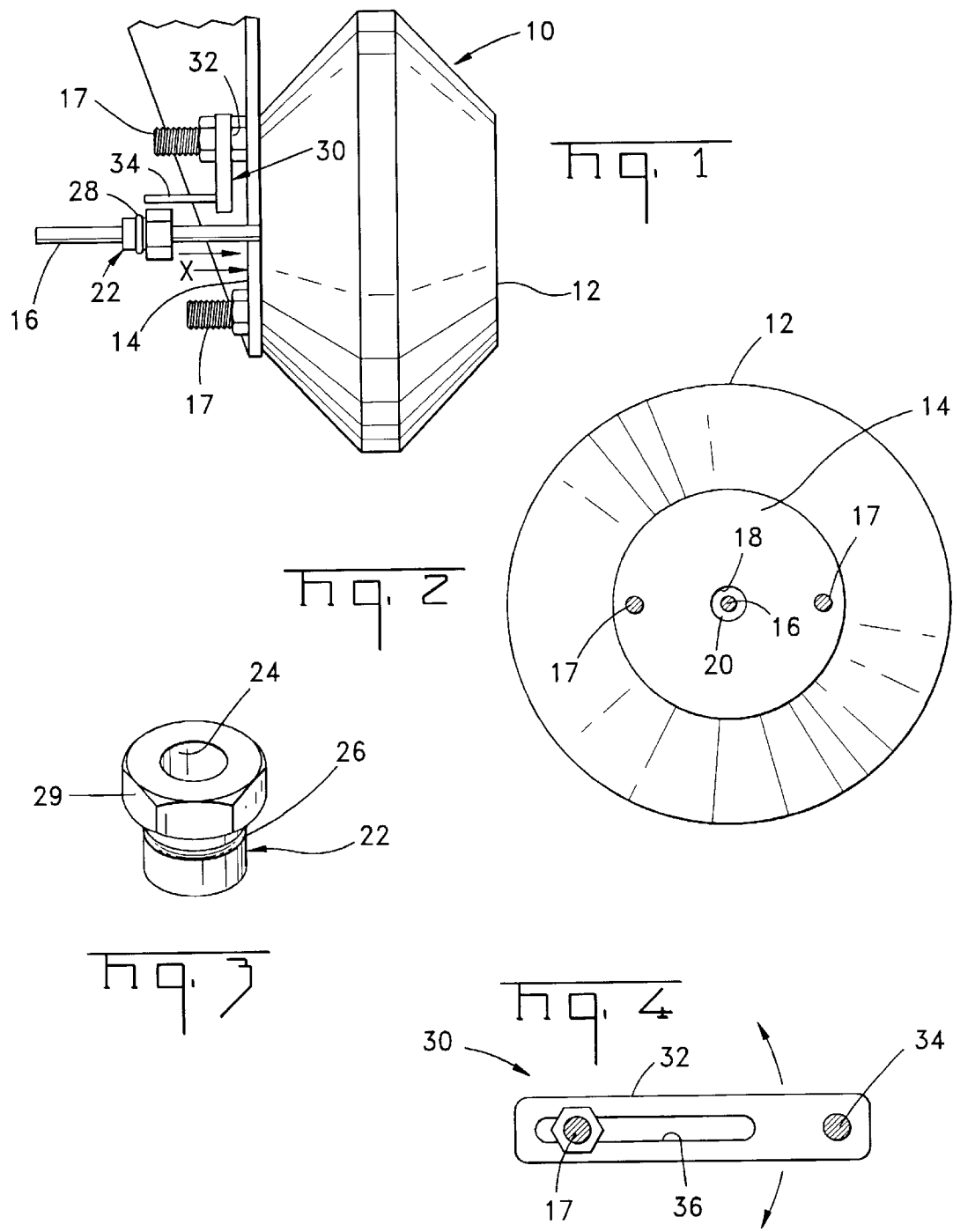

AIR BRAKE STROKE GAGE AND SEAL

FIELD OF THE INVENTION

This invention is directed to the field of air brake adjustment indicators, with a seal to prevent moisture and debris intrusion, in combination with an air brake chamber.

BACKGROUND OF THE INVENTION

The present invention relates to an air brake adjustment system for use with an air brake chamber, where the system includes a seal, and a pivotally adjusted reference marker to provide a convenient visual indication of adjustment of the system.

Most air brake systems utilize a sealed housing, within which is a diaphragm attached to a push rod that extends through one side of the housing. The opposite side of the diaphragm creates an air cavity within the housing. The air pressure in the cavity rises when the brake pedal of the truck is depressed. The diaphragm deforms, and the air pressure rises, in proportion to the amount of force applied to the brake pedal. The push rod responds by moving with the diaphragm to engage the braking surfaces. When the air brake system is properly adjusted, the push rod will travel a distance on the order of up to about two inches from the point where the brake is completely released to the point where it is filly actuated. Over time, as the brakes are repeatedly applied, the push rod travel distance increases, eventually requiring a readjustment of the brake system before the braking capability deteriorates to a level that renders the truck unsafe.

Though the brake housing is generally sealed, problems can arise around the space between the housing opening and the extending push rod. Specifically, in prior art systems, the space is exposed to road moisture and debris allowing same to enter the brake housing which could lead to a premature failure of the brake system. As a consequence, more frequent safety and maintenance checks are required.

While the prior art offers some assistance in providing a stroke adjustment mechanism, they fall short in offering the advantages of the system of this invention. Such prior art is reflected in the following:

a.) U.S. Pat. No. 5,699,880, to Hockley, discloses a brake adjustment indicator for a braking system including a pressure chamber, a push rod extending longitudinally outwards from the pressure chamber and moveable when correctly adjusted between first and second positions, a brake arm and a pivot for pivotally mounting the push rod to the brake arm. The brake adjustment indicator comprises an indicator adapted to be mounted for longitudinal movement with the push rod, a support having a first portion and a second portion, the first portion adapted to be mounted to the vehicle, the support configured to position the second portion opposite to the indicator and first and second reference pointers fixedly positionable on the second portion for marking the first and second positions. A spacer is provided for positioning the first reference pointer in a preselected position relative to the second reference pointer. The first and second reference pointers are mounted for simultaneous movement on the second portion.

b.) U.S. Pat. No. 5,269,253, to Spurlock, teaches a generally C-configured, push rod marker that may be secured to a push rod of an air brake piston without the need for special tools.

c.) U.S. Pat. No. 5,244,061, to Hoyt et al., relates to an air brake stroke length gage in cooperative arrangement with an air brake system. The gage consists of a stroke length indicator and a reference marker. The stroke length indicator is mounted upon and moves with the push rod of the brake system. The reference marker is fixably attached to the air brake system adjacent to the push rod at a distance which corresponds to the appropriate stroke length for the brake system when properly adjusted. When the brake is fully activated, the spacial relationship between the stroke length indicator and the reference marker provides a visual indication of the brake system's adjustment.

d.) U.S. Pat. No. 4,991,310, to Melia, discloses a brake stroke indicator for use on an air brake having an elongated brake push rod that travels a linear distance when the brake is applied. The length of the linear distance traveled depends upon the condition of the brake. The indicator comprises an elongated gauging probe having a plurality of grooves spaced at intervals along the length of the probe. Each such groove extends in a plane transverse to the longitudinal axis of the probe. A push rod bracket is also provided having a flange for engaging the probe in the grooves as the probe is slid longitudinally across the flange. The push rod bracket has clamping arms to allow attachment of the bracket at a preselected position along the length of the push rod such that the flange extends in a plane transverse to the longitudinal axis of the push rod.

e.) U.S. Pat. No. 4,989,537, to Hutchinson, Sr. et al., relates to a brake wear indicator for an air brake system that includes an actuator having a diaphragm adapted to move within the actuator in response to air pressure, and a push rod mechanically coupled to the diaphragm and extending from the actuator through an opening in the actuator wall. The brake wear indicator comprises making means having a generally cylindrical outer surface, a longitudinal axis, a distance indicator on the outer surface, and means for securing the marking means to the push rod within the opening. The marking means thereby provides a visual indication of the position of the push rod along such axis at the opening.

By far, the most important safety feature of any vehicle is its ability to stop effectively. Therefore, in most truck fleet applications, the largest percentage of labor time and expense is brake maintenance. Numerous articles have been written emphasizing the need for proper brakes spec'ing, brake balance, and brake maintenance. Federal mandates are in effect for highway safety, driving the trucking industry toward safer braking systems. Anyone involved in truck maintenance is acutely aware of the liabilities associated with brake safety and maintenance. However, despite the strides the trucking industry has made toward safer braking, roadside inspections still reveal alarming statistics regarding brakes out of adjustment.

Although trucks receive P.M. Inspections at regular intervals, the daily safety inspections rest on the driver's ability to visually inspect and recognize defects. Nearly every item on the driver's vehicle condition report can be visually inspected, except the most critical, leaving the driver solely dependent on "feel". And, as brake related accidents and roadside inspections amply testify, "feel" is not a reliable guide. For example, an unloaded braking system for a truck may "feel" safe, but may not perform safely when loaded or descending a steep grade. The options available to the driver are to continue driving the truck in an unsafe condition, or call for road service and incur downtime. For these reasons, many drivers request daily brake adjustments, whether needed or not. Since there are no adequate visual means to determine brake adjustment, the mechanics must respond to these requests by checking and adjusting the brake stroke at each wheel position, and this can add significantly to transportation costs and downtime.

The present invention offers distinct advantages over the prior art in not only providing a visual indication of the push rod length, and hence the integrity of the brake system, but a seal to prevent dirt, moisture and debris from intruding into the brake chamber during periods of brake inactivity, i.e. highway driving. Additionally, by the use of a pivotally adjustable reference marker, the driver or maintenance personnel can adjust the marker to a more visible position than is available in the prior art systems. The manner by which the many advantages of the system hereof will become apparent to those skilled in the art from the following specification, particulary when read in conjunction with the accompanying drawings.

SUMMARY OF THE INVENTION

This invention relates to the combination of an air brake system having a chamber and an extendable push rod projecting from the chamber, and an elastomeric-like grommet member for securing to the push rod. The system further includes a pivotally mounted reference rod. The reference rod is positioned on the end surface of the chamber extending parallel to the push rod. In the "relaxed" position of the brake system, the elastomeric-like grommet is positioned against the end surface of the chamber and functions as a seal thereby preventing road dirt and debris from entering the chamber. In the "actuated" position of the brake system the push rod, along with the elastomeric-like grommet mounted thereon, is slidably extended outwardly of the brake chamber when the brakes are applied and the chamber is energized. Thus, in the "actuated" or extended position of the push rod, the elastomeric-like grommet is moved away from the end surface of the chamber to serve the further function of a brake stroke indicator. When in this "actuated" position the elastomeric-like grommet cooperates in combination with the pivotally mounted reference rod to provide a clear visual indication of whether the brakes are in need of adjustment.

Accordingly, an object of this invention is to provide an easy reference for quickly assessing the integrity of an air brake system, such as whether adjustments or maintenance are required.

Another object hereof is to provide a seal for the braking system during periods of brake inactivity under driving conditions.

A further object of the invention is the provision of a pivotal mounted reference arm that is movable through a large arc to allow the driver or maintenence personnel to readily position the reference arm to the push rod for a quick and easy visual inspection of the system.

Still another object of the present invention is by the use of the readily visible stroke indicator, significant benefits are realized in reduced labor cost, downtime, and road calls, while increasing safety, maintenance efficiency, and integrity to the braking system of the vehicle, such as a truck.

These and other objects will become apparent to those skilled in the art from the following description.

BRIEF DESCRIPTION OF DRAWING

FIG. 1 is a partial side view of an air brake system, such as for a truck, showing a reciprocal push rod extending from the housing thereof and mounting a circular, elastomeric grommet that performs the dual functions of sealing the housing and providing a visual indication of the push rod stroke length; and, a pivotal reference marker to define the adjusted stroke length.

FIG. 2 is a left end view of the air brake housing showing the spatial relationship of the push rod to the central opening in the housing.

FIG. 3 is an enlarged perspective view of an exemplary elastomeric grommet to be fixed at a predetermined location along the push rod.

FIG. 4 is an enlarged bottom view of the pivotal reference marker, with directional arrows to show the positioning available to the marker.

DETAILED DESCRIPTION OF PREFERRED EMBODIMENT

The present invention is directed to an improved air brake system, such as may be used on trucks, where the improved features hereof may be retrofitted to existing air brake systems, or as original equipment. Such improved features are illustrated in the several Figures, where like reference numerals represent like components throughout the various views.

By way of brief background, braking systems for trucks, typically utilize an air brake system having a pressure chamber, a push rod extending longitudinally outwards from the pressure chamber, a brake arm and a clevis pin for pivotally mounting the brake arm to the push rod. When the brake pedal is depressed, air pressure increases in the pressure chamber. As the air pressure increases, a diaphragm contained in the pressure chamber deforms and exerts an outward pressure on the push rod. The deformation of the diaphragm causes the push rod to move outwardly from the pressure chamber, actuating the braking mechanism. When air brake systems are properly adjusted, the push rod extends from a first or inactive position to a second or active position. Over time, as the brakes are repeatedly applied, the distance traveled by the push rod may increase requiring the brake system to be adjusted.

Further, during the "inactive" period, i.e when the brakes are not engaged and the truck, for example, is traversing the roadways, moisture, dirt and debris may be splashed onto the air brake housing and enter into the housing causing potential damage or even failure of the brake system.

Turning now to the several Figures, in FIG. 1 there is illustrated an air braking system 10 comprising a housing or pressure chamber 12 having a face 14 through which a push rod 16 projects, and a pair of threaded, mounting members 17. FIG. 2 shows the concentric 10 relationship of the push rod 16 to the face opening 18, with the annular spacing 20 therebetween. Though not illustrated, a typical air brake system may further include a brake arm or slack adjuster. The brake arm or slack adjuster is pivotally mounted to the free end of the push rod.

FIG. 1 illustrates the extended or active mode for the air braking system 10, where "X" defines the stroke length for an adjusted air brake system. With the system adjusted, the elastomeric grommet 22 (FIG. 3) may be positioned along the push rod 16 at the location consistent with the stroke length "X". The elastomeric grommet is generally circular in configuration with a central opening 24 sized to frictionally engage the push rod 16. Particularly for retrofitting to existing push rods from a brake chamber, the grommet may include a vertical slit to allow wrapping same about the push rod. The grommet may be further configured with a reduced center section 26 for receiving a restricting hose type clamp 28 or plastic tie binder to fix the grommet at the desired location. Further, to facilitate positioning the grommet along an unrestricted push rod 16, the upper portion may be hexagonally shaped 29 to accommodate a mechanical tool, as known in the art, to move same into position.

In the inactive mode, namely brake pressure released, the push rod 16 retracts into the housing chamber 12 where the elastomeric grommet 22 abuts the lower face 14 and face opening 18. Due to the flexible nature of the grommet, it yields and fills the face opening 18 to effectively seal the housing from moisture, dirt, and debris. It is in this inactive mode when the housing is generally most vulnerable to intrusion by moisture, dirt and debris. Such intrusive materials can enter the housing where they act as abrasives to the diaphram causing its premature failure.

Since the brake system may, through extended travel and use, go out of adjustment, it is a common practice to incorporate a reference marker to visually indicate whether the brake system is adjusted or just how far out of adjustment it may be. Typically, as described in the above prior art, the reference markers are fixed in close proximity to the push rod. Unfortunately, the fixed reference markers may be positioned at an inconvenient location, or visibly blocked for easy viewing.

The present invention incorporates a pivotal reference marker 30 comprising a pivotal bracket 32 and a marker rod 34 extending perpendicular therefrom. The bracket 32, as illustrated in FIG. 4, comprises an elongated generally planar member having a slot 36, the width of which is sized to be received on threaded member 17. As an alternative to a threaded opening for the marker rod 34, the bracket may be provided with a pair of crimping tabs, not shown, to secure the marker rod 34. In either case, by this arrangement, the bracket 32 may be moved toward or away from the push rod, as well as pivoted about the threaded member 17. This gives the driver or maintenance personnel the freedom to select the best location for the marker rod 34 where it is most visibly accessible during safety checks along the road.

Accordingly, by the use of the inventive features described above, there is provided a readily visual reference marker throughout the stroke of the brake chamber's actuating rod. This is important for several reasons. In the "brakes applied" mode, the indicator reference is used to determine brake adjustment and balance. In the "brakes released" mode, the indicator reference identifies those brakes not fully releasing due to either mechanical or pneumatic problems. Additionally, with the brakes released and the vehicle traveling, the indicator further functions as a brake chamber seal keeping road debris out of the service chamber.

While a preferred embodiment has been described above, it should be recognized that variations may be had with respect to the components of this invention. Therefore, wile the invention has been disclosed in a preferred form only, it will be obvious to those skilled in the art that many additions, deletions and modifications can be made therein without departing from the spirit and scope of this invention, and that no undue limits should be imposed thereon except as set forth in the following claims.

I claim:

1. In an improved air brake system comprising an air brake housing having a first face with a central opening for receiving a push rod, that extends from a first position representing an inactive mode for said brake system, to a second position representing an active mode for said brake system, with respect to said first face, the improvement comprising in combination therewith the provision of a circular elastomeric grommet fixed to a push rod at a location co-extensive with said second position, a pivoting bracket mounting a reference marker perpendicular to said bracket, where a free end of said reference marker is co-extensive with said second position, whereby in said first position said elastomeric grommet lies adjacent to and seals said central opening.

2. The improved air brake system according to claim 1, wherein said bracket is pivotal through a large arc while maintaining a parallel relationship between said push rod and said reference marker.

3. The improved air brake system according to claim 1, wherein said elastomeric grommet frictionally engages said push rod.

4. The improved air brake system according to claim 3, wherein said elastomeric grommet includes a reduced central dimension for receiving a circumferentially binding member.

5. The improved air brake system according to claim 1, including a threaded rod which projects from said air brake housing for receiving said pivoting bracket.

6. The improved air brake system according to claim 5, wherein said reference marker is movable both along and toward and away from said threaded rod, and said bracket is pivotal about said threaded rod, whereby to permit selective positioning of said reference marker relative to said push rod.

* * * * *